(12) United States Patent
Hamilton, II et al.

(10) Patent No.: US 10,391,414 B2
(45) Date of Patent: Aug. 27, 2019

(54) INTERACTIVE DEVICE WITH ADVANCING LEVELS OF COMMUNICATION CAPABILITY

(71) Applicant: INTERNATIONAL BUSINESS MACHINES CORPORATION, Armonk, NY (US)

(72) Inventors: Rick A. Hamilton, II, Charlottesville, VA (US); Kevin C. McConnell, Austin, TX (US); Yin Xia, Beijing (CN); Yu Lin Zhai, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 15/416,174

(22) Filed: Jan. 26, 2017

(65) Prior Publication Data
US 2018/0211559 A1    Jul. 26, 2018

(51) Int. Cl.
*A63H 3/00*    (2006.01)
*G09B 19/04*    (2006.01)
(Continued)

(52) U.S. Cl.
CPC .............. *A63H 3/003* (2013.01); *A63H 3/28* (2013.01); *B25J 9/163* (2013.01); *G06F 17/2785* (2013.01); *G06N 3/004* (2013.01); *G06N 3/008* (2013.01); *G06N 20/00* (2019.01); *G09B 19/04* (2013.01); *G09B 19/06* (2013.01);
(Continued)

(58) Field of Classification Search
None
See application file for complete search history.

(56) References Cited

U.S. PATENT DOCUMENTS 6,290,566 B1 *   9/2001   Gabai ..................... G10L 13/00
                                                         446/175
8,272,919 B2     9/2012   Hornsby et al.
(Continued)

OTHER PUBLICATIONS

Guorong et al., "Application of Human-Machine Interaction in Toy Design", Information Technology and Artificial Intelligence Conference (ITAIC), Aug. 20-22, 2011 (pp. 275-277).
(Continued)

*Primary Examiner* — Jason T Yen
(74) *Attorney, Agent, or Firm* — Brain Restauro, Esq.; Kevin P. Radigan, Esq.; Heslin Rothenberg Farley & Mesiti P.C.

(57) ABSTRACT

A cognitive system is provided which includes an interactive device, such as a toy, for communicating with a user. The cognitive system includes different levels of communication capability for communicating with the user via the interactive device. The system adjusts from one level of communication capability to another level of communication capability of the different levels of communication capability based on occurrence of one or more specified conditions of user communication with the interactive device. For instance, the different levels of communication capability may include multiple levels of language capabilities, and the one or more specified conditions may include one or more language-based interaction conditions, time-based interaction conditions, or physical-based interaction conditions of the user with the interactive device.

20 Claims, 10 Drawing Sheets

(51) Int. Cl.
  *H04L 29/08* (2006.01)
  *G09B 19/06* (2006.01)
  *A63H 3/28* (2006.01)
  *G06N 3/00* (2006.01)
  *B25J 9/16* (2006.01)
  *G10L 15/00* (2013.01)
  *G06F 17/27* (2006.01)
  *G06N 20/00* (2019.01)
  *H04L 29/06* (2006.01)

(52) U.S. Cl.
  CPC .............. *G10L 15/00* (2013.01); *H04L 67/12* (2013.01); *H04L 67/34* (2013.01); *H04L 69/24* (2013.01); *A63H 2200/00* (2013.01)

(56) References Cited

U.S. PATENT DOCUMENTS

| | | | |
|---|---|---|---|
| 8,594,839 B2 | 11/2013 | Hanson | |
| 9,396,437 B2 | 7/2016 | Ponomarev et al. | |
| 2005/0154594 A1* | 7/2005 | Beck | G09B 19/04 704/276 |
| 2006/0068366 A1 | 3/2006 | Chan et al. | |
| 2006/0080539 A1* | 4/2006 | Asami | G06F 21/34 713/182 |
| 2009/0210803 A1* | 8/2009 | Brignull | G06Q 10/00 715/757 |
| 2012/0252306 A1* | 10/2012 | Chan | A63H 3/20 446/90 |
| 2014/0273717 A1* | 9/2014 | Judkins | A63H 3/28 446/175 |
| 2015/0133025 A1 | 5/2015 | Ponomarev et al. | |
| 2015/0251102 A1 | 9/2015 | Kuo | |
| 2016/0019016 A1 | 1/2016 | Kochavi | |
| 2016/0075018 A1 | 3/2016 | Izhikevich et al. | |
| 2016/0158658 A1 | 6/2016 | Lakritz et al. | |
| 2016/0225187 A1 | 8/2016 | Knipp et al. | |

OTHER PUBLICATIONS

Mel, Peter and Tim Grance, "The NIST Definition of Cloud Computing," National Institute of Standards and Technology, Information Technology Laboratory, Special Publication 800-145 (Sep. 2011) (7 pages).

Murphy et al., "i4Toys: Video Technology in Toys for Improved Access to Play, Entertainment, and Education", IEEE International Symposium on Technology in Society (ISTAS), Nov. 11-12, 2015 (6 pages).

International Business Machines Corporation (IBM), "z/Architecture Principles of Operation," IBM® Publication No. SA22-7832-10, Eleventh Edition, Mar. 2015, pp. 1-1732.

International Business Machines Corporation (IBM), "Power ISA™ Version 2.07B," International Business Machines Corporation, Apr. 9, 2015, pp. 1-1527.

\* cited by examiner

INTERACTIVE DEVICE WITH ADVANCING LEVELS OF COMMUNICATION CAPABILITY

BACKGROUND

A toy is traditionally an object for a child to play with or an object, such as a gadget or machine, providing amusement for an adult. Most physical toys do not interact at an emotive level with a user, but rather create only a passive play experience. Most electronic games are interactive, but with little or no benefit to a user's knowledge and psychological growth, and are virtually devoid of any physical interaction. Within these extremes, opportunities exist to enliven toys to create new relations and peak a individual's interest.

SUMMARY

The shortcomings of the prior art are overcome and additional advantages are provided through the provision, in one or more aspects, of a cognitive system which includes an interactive device for communicating with a user. The cognitive system also includes a memory, and a processing circuit communicatively coupled with the memory to perform a method, including: providing different levels of communication capability for communicating with the user via the interactive device; and adjusting from one level of communication capability to another level of communication capability of the different levels of communication capability based on an occurrence of one or more specified conditions of user communication with the interactive device.

Advantageously, the cognitive system disclosed herein includes a growing capability of the interactive device (using, for instance, natural language processing) responsive to external stimuli, such as, based on occurrence of specified conditions of user communication with the interactive device. The device advances its natural language processing capability (e.g., levels of vocabulary, grammar, proficiency level, language style, etc.) in response to the user's communication input. For example, the more a user interacts with the device, the faster the communication interactions between the user and the device may advance. The growth of the interactive device can include using preset content at different levels, as well as personalized content (e.g., added by a parent or other owner of the interactive device), or personalized content learned from a specified user of the device, who may be different from the owner. In one or more embodiments, input and output content filtering may be employed to avoid offensive or inappropriate content being added. Further, user authentication, such as biometric verification, may be used to identify a particular individual who is to provide communication input that may affect adjusting from one level of communication capability to another level, while others may or may not interactively communicate with the device depending on the implementation. Advantageously, the capabilities disclosed herein provide commercial advantage by encouraging an individual to use the device (e.g., toy), as well as the underlying natural language processing service. To an extent, more user interactions will actually help improve the natural language processing service. An interactive device implemented with the techniques described can "grow" with the individual user in terms of communication capability, which can advantageously promote the individual's communication skills and mental experience. Further, the features described herein provide a greater opportunity to understand user communication preferences, and enhance customer engagement with the device. The techniques presented can also assist in personalizing the communication capability of the device, with the device being capable of adapting, in one or more embodiments, to the individual's language abilities and style.

In one or more implementations, adjusting from one level of communication capability to another may be based on counting specified communication inputs of the user to the interactive device. For instance, the one or more specified conditions of user communications with the interactive device may include the counting of specified communication input exceeding a set threshold. In certain embodiments, the counting of specified communication inputs of the user to the interactive device may include counting user communication stimuli in at least two of: a lower communication level than the one level of communication; the one level of communication; and a higher communication level. Further, the counting of user communication stimuli may include tracking at least one of communication time or communication frequency of the user in communicating with the interactive device in at least two of the lower communication level, the one level of communication, and the higher communication level.

In one or more embodiments, the different levels of communication capability include multiple levels of language capabilities, and the one or more specified conditions include one or more conditions from a group consisting of language-based interaction conditions, time-based interaction conditions, and physical-based interactions.

In one or more implementations, providing the different levels of communication capability may include storing, at least in part, language-based content of the different levels of communication capability. Further, in one or more embodiments, the method may include allowing an owner of the interactive device to set, at least in part, language-based content of one or more levels of communication capability of the different levels of communication capability.

In one or more implementations, adjusting from one level of communication capability to another may include advancing from the one level of communication capability to the other level of communication capability, where the other level of communication capability is a higher level of communication capability than the one level of communication capability.

In one or more embodiments, the method may include mirroring by the cognitive system one or more communication traits of the user. The mirroring may include adapting one or more of the different levels of communication capability based on one or more of words, language, and emotion of the user when communicating with the interactive device.

In one or more embodiments, the interactive device includes, or is, a toy. In certain embodiments, the user is a specified user, and the method may include authenticating the specified user. In such cases, the adjusting from the one level of communication capability to the other is based on the occurrence of the one or more specified conditions of only the specified user in communicating with the interactive device.

In certain embodiments, another user can communicate with the cognitive system via the interactive device, without effecting the adjusting from the one level of communication capability to the other level of communication capability. In these cases, only a specified user is able to affect the occurrence of the one or more specified conditions of user communication with the interactive device.

In one or more implementations, the different levels of communication capability include different levels of communication content. The communication content may include one or more of words, vocabularies, grammar, language proficiency, language style, etc.

In another aspect, a computer program product for facilitating an interactive device communicating with a user is provided. The computer program product includes a computer-readable storage medium having program instructions embodied therewith, the program instructions being readable by a processing circuit to perform a method. The method includes providing different levels of communication capability for communicating with the use via the interactive device; and adjusting from one level of communication capability to another level of communication capability of the different levels of communication capability based on occurrence of one or more specified conditions of user communication with the interactive device.

In a further aspect, a method is provided which includes: providing an interactive device for communicating with a user; providing different levels of communication capability for communicating with the user via the interactive device; and adjusting from one level of communication capability to another level of communication capability of the different levels of communication capability based on occurrence of one or more specified conditions of user communication with the interactive device.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
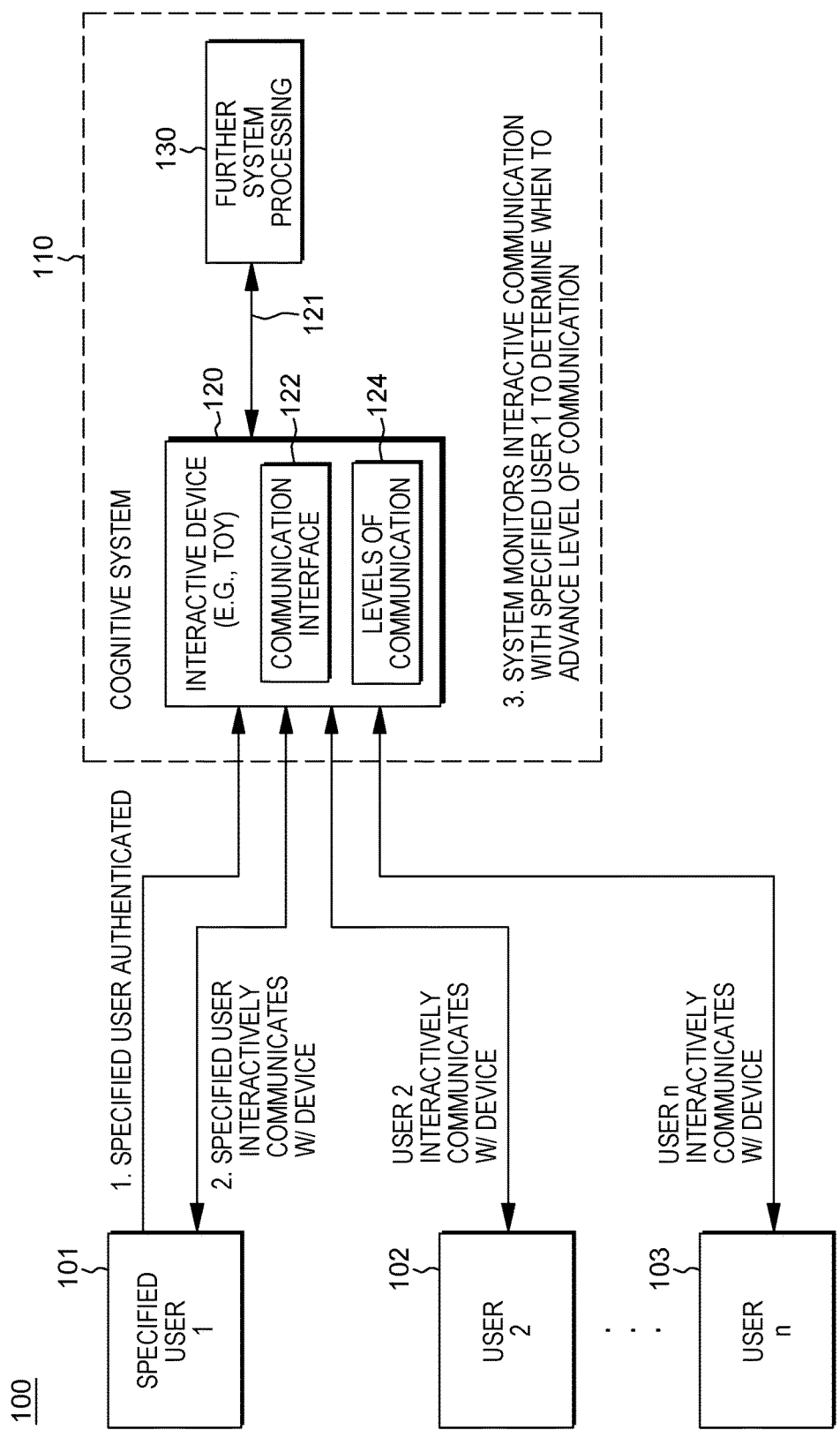
FIG. 1 depicts one embodiment of a cognitive system with multiple users communicating therewith via an interactive device of the cognitive system, in accordance with one or more aspects of the present invention.

The description that follows includes exemplary devices, systems, methods, and instruction sequences that embody techniques of the present invention. However, it should be understood that the described invention may be practiced, in one or more aspects, without the specified details. In other instances, known protocols, structures and techniques have not been shown in detail in order not to obscure the invention. Those of ordinary skill in the art will appreciate that the described techniques, devices and mechanisms may be applied to various systems to facilitate implementing an interactive device, such as a toy, with multiple levels of communication capability growth as described herein.

In general, in interactive device such as discussed herein is indicative or inclusive of various types of portable devices, such as a child's toy (e.g., doll, robot, teddy bear, etc.) or other object, such as a gadget or machine providing amusement (e.g., for an adult). An interactive device such as referenced herein may have memory for storing instructions and data, as well as hardware, software and firmware combinations thereof. The interactive device is part of or embodies a cognitive system which includes, in one or more aspects, an artificial intelligence facility providing cognitive communication capabilities to the interactive device. In one or more implementations, the interactive device may be a device (such as a toy) capable of being carried, for instance, by a child. Note also that "communication" used herein refers to different types of interactions of a user with the interactive device, include verbal or physical interactions, such as a child hugging the device. Further, in one or more embodiments, as a child progresses, the communications of interest may focus more on verbal communications.

As noted, most toys do not interact at an emotive level with a user, but rather create a passive play experience. Further, most electronic games are interactive, but provide little or no benefit to a user's knowledge and psychological growth, and are virtually devoid of any physical interaction. Within these extremes, physical toys which utilize, for instance, artificial intelligence or machine learning technology, would be able to communicate with a user, but they generally omit any capability to communicate in a manner which would allow the device to "grow" in communication capability as the user progresses. For instance, current robotic toys typically act in a fully formed state, and thus have somewhat static personalities.

Advantageously, disclosed herein is a cognitive system which includes an interactive device, such as a toy, and (in one or more embodiments) artificial intelligence based, for instance, on a neural probabilistic language model. The interactive device may grow by language and physical stimulation of a specified user (e.g., a particular child) interacting with the device. Although the system contains multiple levels of communication capability (such as different vocabulary levels) the multiple levels cannot be fully used in the beginning. Only when the user's communication (e.g., language, and/or physical interaction) reaches one or more specified conditions is the next level of communication accessed by the device.

By way of specific example, a child (similar to a parent) may take care of the interactive device (e.g., doll or other toy) and teach it. The more the child talks and handles the toy, the more enhanced vocabularies can be stimulated over time. Furthermore, through the use of accelerometers, the child's physical interaction with the toy may impact the toy's progress, as noted herein.

In certain embodiments, the interactive device may have artificial intelligence associated with it (e.g., natural language processing, machine learning, etc.) which is configured to start at an initial level of intelligence (with a limited vocabulary, a limited ability to learn quickly, etc.), and based on the child's or other user's communication with the device, advance to a higher level of communication capability (for instance with a greater vocabulary, faster learning ability, etc.).

As explained herein, in one or more implementations, the interactive device (e.g., toy) may be capable of communicating with any user, but only advances in communication level based on communication interactions with a specified user. Various approaches to authenticating the specified user are possible, such as password authentication and/or biometrics-based authentication.

Further, the cognitive system and, in particular, the communication capabilities of the device, may be designed to mirror the communication ability, personality traits, etc. of the particular user, and to change its communication and personality traits based on corresponding changes detected in communications with that user. In one or more implementations, advancing to a higher level of communication capability may be in response to counting a threshold quantity of a predetermined communication condition, such as a predetermined number of verbal or physical interactions with the portable device (e.g., learn and use 50 new words out of a list of 100 words to proceed to the next communication level, hug the device (e.g., doll or stuffed animal) N times to proceed to the next communication level, etc.).

Note that reference is made below to the drawings, which are not drawn to scale for ease of understanding, wherein the same reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application, for instance, for establishing a desired interactive device with advancing levels of communication capability.

By way of example, FIG. 1 depicts one embodiment of interactive communication of multiple users 101, 102, and 103 with a cognitive system 110, in accordance with one or more aspects of the present invention. In the example of FIG. 1, user 101 is the specified user for which interactive device 120 is intended. Additionally, users 2 through N 102, 103 may be able to communicate interactively with device 120, but may not affect progress of the device from one communication level to the next. Note that this is an example only. In one or more other embodiments, cognitive system 110 could be configured such that only specified user 101 is able to communicate with the interactive device 120, with the device not processing input from or responding to the other users 102, 103.

As depicted in FIG. 1, cognitive system 110 may include, in addition to interactive device 120, further system processing 130, which may be resident within interactive device 120, or remote from interactive device 120 via, for instance, a wireless connection to, for instance, a home network, or other computer connected to the internet to allow, for instance, the further system processing 130 to be remote from interactive device 120 (in one or more embodiments). For instance, in one or more embodiments, further system processing 130 may be cloud-based processing that facilitates providing interactive device 120 with artificial intelligence, such as natural language processing abilities.

Interactive device 120 may include a communication interface 122 which allows interactive device 120 to communicate, for instance, verbally (or physically) with one or more users. Further, interactive device 120 may include multiple levels of communication capability 124, which may be stored locally within interactive device 120, or remote, for instance, in association with further system processing 130. In one or more embodiments, interactive device 120 may be or include a toy, such as a doll, robot, stuffed animal, gadget or other object.

As noted, the cognitive system, via interactive device 120, has in one or more aspects an advancing or growing communication capability of natural language processing in response to external user communication stimuli. The device may advance its natural language processing capability level (e.g., vocabulary, grammar, proficiency level, language style, etc.) in response to the specified user's communication inputs. For example, the more the specified user progresses in interacting with the device, the faster the device's vocabulary and verbal interactions may advance to, for instance, a next communication level and/or to mirror the vocabulary and verbal interaction capabilities of the specified user. The progress path can include preset content at different communication levels, as well as the ability to accommodate personalized content which, for instance, has been programmed by an owner (e.g., parent), as well as learned content from the specified user of the device. As explained further below, input and output content filtering may be used to avoid offensive or inappropriate content being included in the device's communication capabilities, such as obscenity or other anti-social language. Also as noted, in one or more embodiments, user authentication, such as the use of biometric technology (e.g., speech recognition, facial recognition, fingerprint recognition, etc.) could be used to identify the specified individual who can input content into the device or to whom the device may output content, i.e., communicate with.

In operation, specified user 101 of FIG. 1 may initially be authenticated (step 1) and then interactively communicate with cognitive system 110 via communication with interactive device 120. As noted, the communication may involve verbal or physical interaction. Further, note that the one or more specified conditions of user communication with the interactive device to affect a change in communication level may vary based on product. For instance, an interactive device such as a doll intended for an infant to first grade level may have different specified conditions then another toy intended for an older child.

As explained, in one or more implementations, the interactive device includes a capability to progress in communication level responsive to a specified user's communication stimuli into the device. The user's communication stimuli may include, but not be limited to:

The time and frequency that the user is communicating with the interactive device, that is to say how much time the user plays or interacts with the device.

The way the specified user is using the device, which may involve evaluating the specified user's actions and language in playing or interacting with the device.

The complexity of the communication input provided by the specified user, such as words and vocabulary, grammar, context, proficiency level, language style, etc. Appropriate words for different levels of child development or grades may be acquired from various public vocabulary lists such as https://www.flocabulary.com/wordlists/ or http://www.bigiqkids.com/SpellingVovabulary/Lessons/wordlistFinder.sht ml The emotion, tone and personality of the specified user when communicatively interacting with the device, including emotions such as anger, fear, joy, sadness, disgust, soft spoken, gregarious, talkativeness (which may be evaluated by a personality and tone analysis engine using, for instance, artificial intelligence such as disclosed herein).

Other factors such as device components, water, light, energy, temperature, acoustic, vibration, radiation, etc. (via various sensors provided on the interactive device).

Other virtual factors, such as electronic form of physical factors mentioned above.

With the external, user communication stimuli mentioned, the capabilities of natural language processing could be employed to selectively progress the interactive device. By way of example, the progression may be from a lower communication level to a higher communication level, from simple communication to more complex communication, or from a beginner (or infant) stage to a more advanced communication stage. However, in one or more instances, the process could also be reversed (for instance, where the system may have advanced levels too soon). The natural language processing communication capability of the interactive device may progress along predetermined stages or levels, with the levels providing appropriate capabilities as the specified user grows up. The interactive device receives user communication input, that is used to generate personalized growth of the device. That is to say, the device may learn the words, language and emotion of the specified user and advance based on advancements in the user's communication skills.

Figure 2:
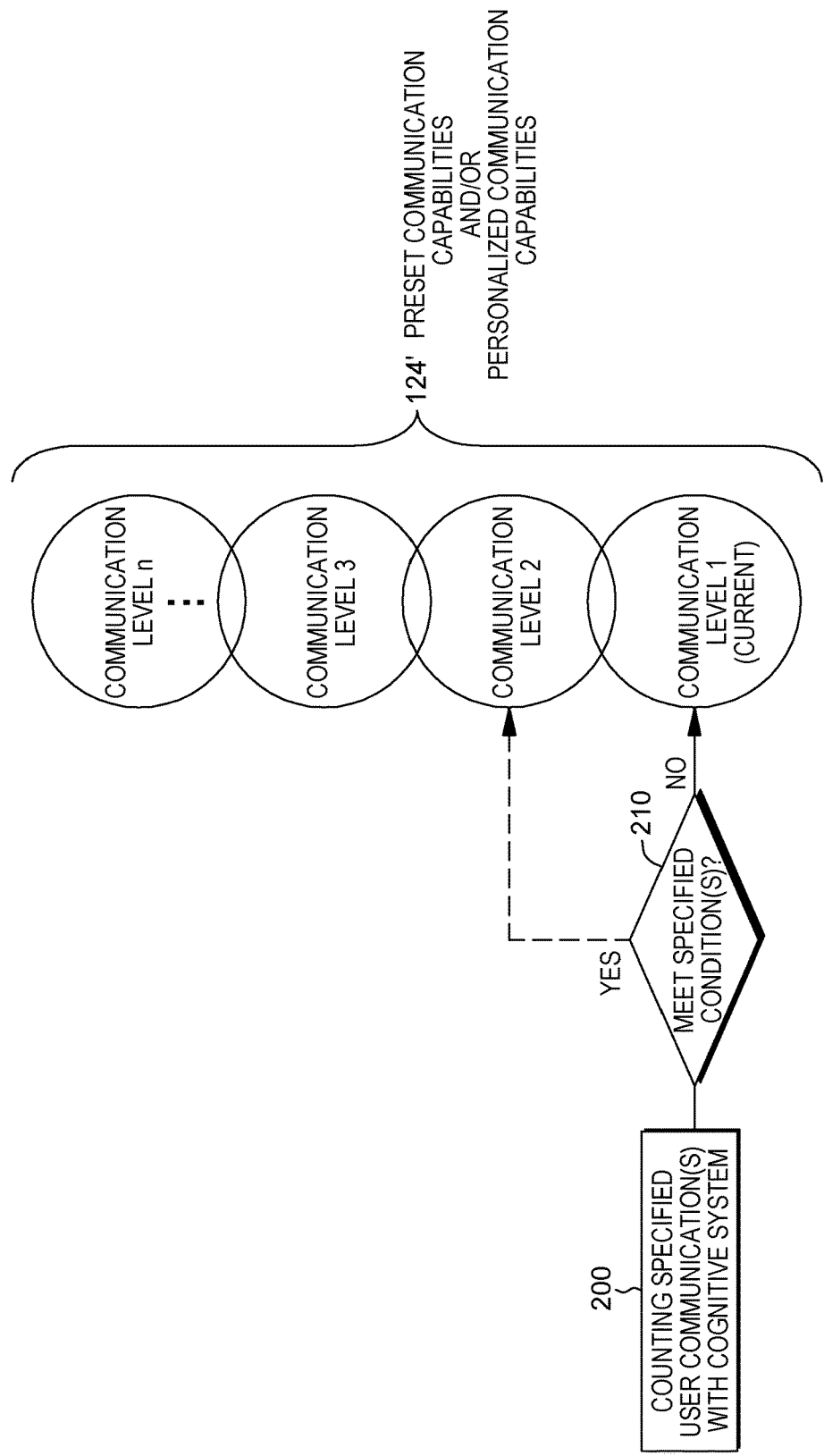
FIG. 2 depicts one embodiment of processing implemented by a cognitive system, in accordance with one or more aspects of the present invention.

By way of further example, reference FIG. 2 where the cognitive system counts specified user communication(s) 200 and determines whether one or more specified conditions have been met 210 to progress to a next communication level 124'. If "no", then the interactive device stays at the current communication level, for instance, communication level 1 in the example of FIG. 2, and if "yes", then the interactive device progresses to the next communication level, for instance, level 2 in FIG. 2.

Note that the communication levels may include preset communication capabilities and/or personalized communication capabilities 124'. For instance, in one or more implementations, each communication level in the progress path may include preset natural language processing capability (e.g., vocabulary, grammar, proficiency level, language style, etc.), as well as personalized communication capabilities input by, for instance, an owner (e.g., parent) or learned from the specified user through the user's communication with the interactive device. The communication levels may contain similar or different content, such as similar as well as different words, vocabulary, grammar, proficiency level, language style, etc. Where the cognitive system is configured to accept personalized communication capability from the owner or the specified user, then input and output content filtering may be used (as explained further below with reference to FIG. 4) to avoid offensive or inappropriate content, such as by using a "white list" or "black list" generated by a manufacturer and stored in the cloud.

In operation, a user may set an initial state of the device (that is, an initial communication capability level), and can specify one or more of the communication conditions by which the device may progress from one level to the next. This specifying may include identifying and even combining communication conditions as desired. As showing in FIG. 2, when the device receives valid communication stimuli from the specified user (such as one or more words in one or more sets of words), the system counts the stimuli. If the amount of accumulated communication stimuli reaches a specified threshold condition, then the state of the device (such as its communication capability) may be advanced to the next level.

Various communication interactions may be counted including, for instance, total stimulation time or frequency at a lower communication level than the current level, total stimulation time or frequency at the current communication level, and/or total stimulation time or frequency at a higher communication level than the current communication level of the interactive device. Note that, in one or more implementations, all of these levels may be counted, or only some of the levels counted towards advancing the interactive device from one communication level to the next (or potentially lowering the communication level of the interactive device). Further, note that the communication conditions may be weighted with different values. For instance, the stimuli of a higher communication level may have a higher weighted value in counting towards the growth condition. Note that numerous other approaches to determining occurrence of one or more specified conditions of user communication with the interactive device for advancing the communication level of the interactive device may be implemented by those skilled in the art.

Figure 3:
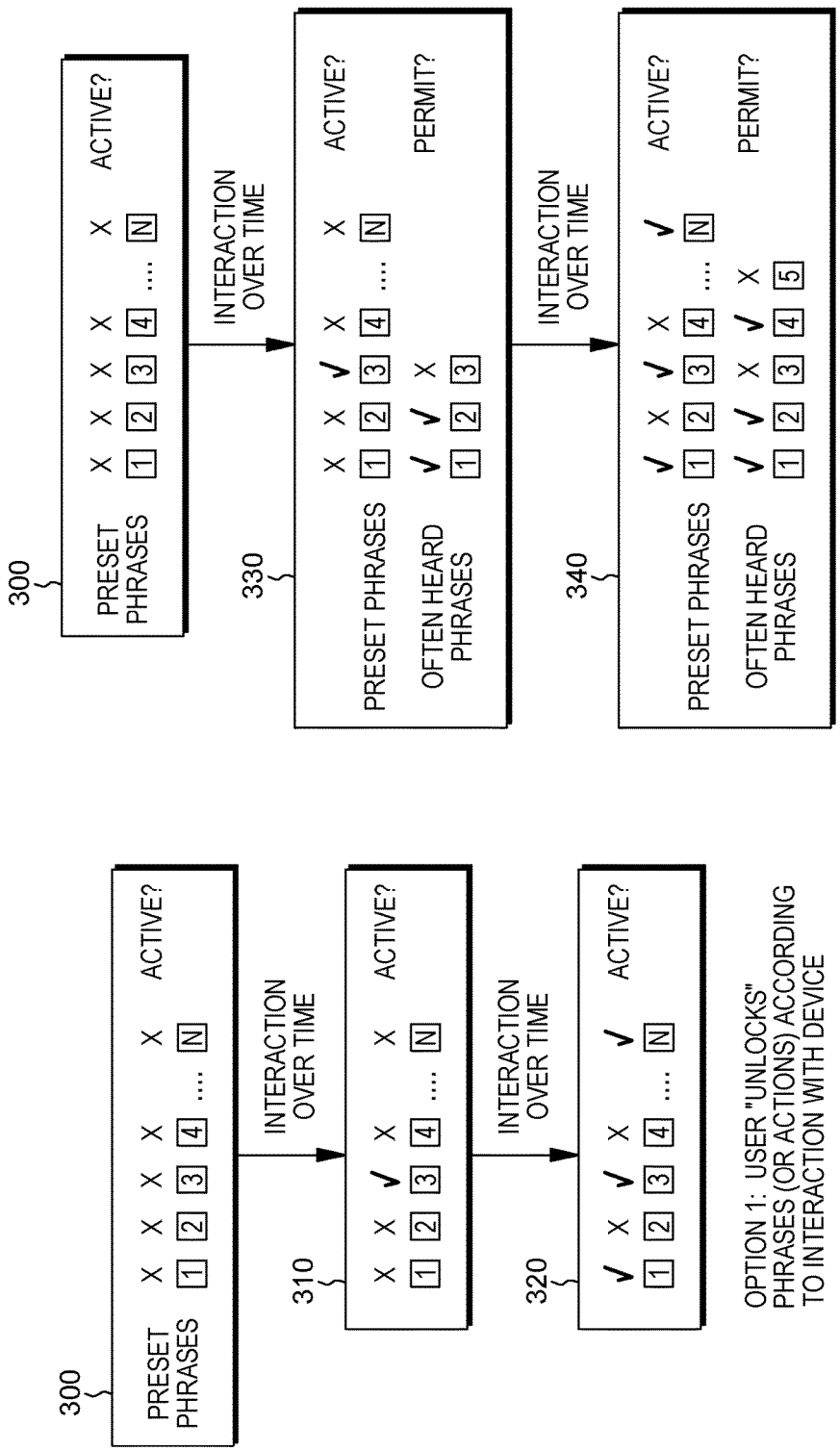
FIGS. 3A & 3B depict optional approaches for tracking a user's communication with an interactive device, in accordance with one or more aspects of the present invention.

By way of example, FIGS. 3A & 3B depict different options for activating words or phrases within the interactive device, which may be used in one or more embodiments for advancing the communication level of the device. In FIG. 3A, an embodiment is depicted where the potential vocabulary (and actions) of the interactive device are preset, for instance, by the manufacturer. For instance, certain preset phrases may be provided, which may be static, from an initial programming, or may be updatable through periodic software upgrades. In this case, the means by which the user interacts with the device will determine which device characteristics or phrases will be activated. These user stimuli could include (for example) vocabulary use, tonality of expression, as well as physical interaction between the child and device. As shown in FIG. 3A, the specified user (e.g., child) unlocks phrases or actions by communicating with the device, with a number of preset phrases 300 being identified initially, and the cognitive system monitoring the user's communication interaction over time to note that the user has used one or more of the preset phrases 310, which is indicated in this example by the phrases now being active. Continued user communication interaction over time with the device may result in further preset phrases becoming active 320. Once a defined number of preset phrases in the current communication level have been activated, then the system may progress the interactive device from the current communication level to a next communication level, as explained herein.

FIG. 3B depicts another embodiment where certain elements of vocabulary (and possibly actions) of the interactive device may be preset 300. Similarly, the means by which a specified user interacts with the device will determine which preset characteristics are activated over time 330. However, in this approach, the user may also communicate certain phrases (or actions) to the interactive device. These phrases (or often heard phrases) may, in one or more embodiments, be checked (such as through a cloud-based service) for appropriateness before being adopted by the interactive device. For instance, inappropriate phrases or subjects could be "blacklisted" and never become part of the device's vocabulary. This learning facility makes for a richer and more personalized play experience for the user or child. As illustrated, certain often heard, permitted phrases may be added 330 based on communication interaction of the user with the device overtime, with additional phrases being shown added after further communication interaction with the device 340. In this manner, through a series of communication interactions with the device, the device's perceived knowledge or communication capability can progress.

Figure 4:
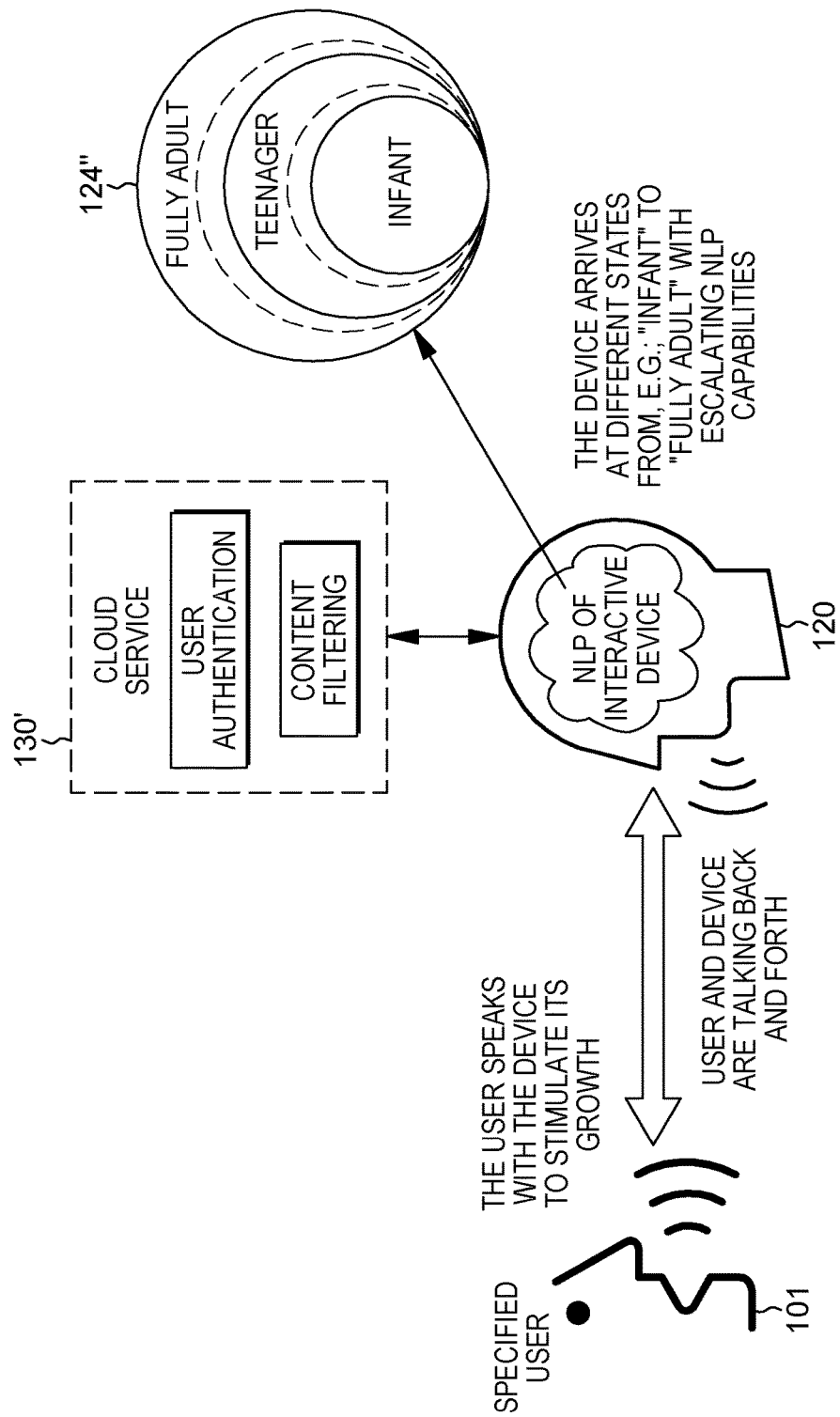
FIG. 4 depicts another embodiment of a user communicating with an interactive device, in accordance with one or more aspects of the present invention.

FIG. 4 depicts a further example of communication interaction with a device or system, in accordance with one or more aspects of the present invention. In FIG. 4, a specified user 101 is communicating, for instance, verbally talking back and forth, with the interactive device 120, such as a doll, robot, etc. As illustrated, interactive device 120 may include multiple levels of communication capability 124" from, in this case, infant, through teenager to fully adult with each level or phase having different communicative capabilities. Alternatively, in one or more implementations, a continuum of advancing communication capabilities may be provided to the interactive device. In certain embodiments, younger levels may require more patience and attention, whereas upon reaching adulthood, the interactive device could facilitate or stimulate deeper emotions and feelings of friendship with the user. In one or more embodiments, during the progression of the interactive device between levels or stages, the device could become, for instance, shy in its language interactions because the user is shy when communicating with the device, etc.

Furthermore, the user (or parent) could set an exclusive mode requiring user authentication on the interactive device. When another individual, not the specified user, communicates with the device, the device may interact with that person, but it wouldn't regard this communication as valid communicative content to be evaluated for an occurrence of one or more specified conditions upon which to base advancement of the communication capability of the device. That is to say, no person but the specified user could communicatively stimulate the device under the exclusive mode. Further, as noted, content filtering could be enabled to avoid offensive and inappropriate words being included in the vocabulary of the device. User authentication (using, for instance, one or more biometric technologies) and content filtering may be provided as a cloud-based service 130', in one or more embodiments.

In one or more implementations, natural language processing, or other artificial intelligence, could be employed in evaluating the user's communications with the device, and communicating with the user in general. For instance, a deep learning based approach may be employed to allow the device to grow with advancing communication content of the user interacting with the device. One such system that may be used is the Watson™ system available from International Business Machines Corporation of Armonk, N.Y. The Watson™ system is an application of advanced natural language processing, information retrieval, knowledge representation and reasoning, and machine-learning technologies in the field of open domain question answering. The Watson™ system may be built on International Business Machine Corporation's DeepQA™ technology used for hypothesis generation, massive evidence gathering, analysis, and scoring.

Figure 5:
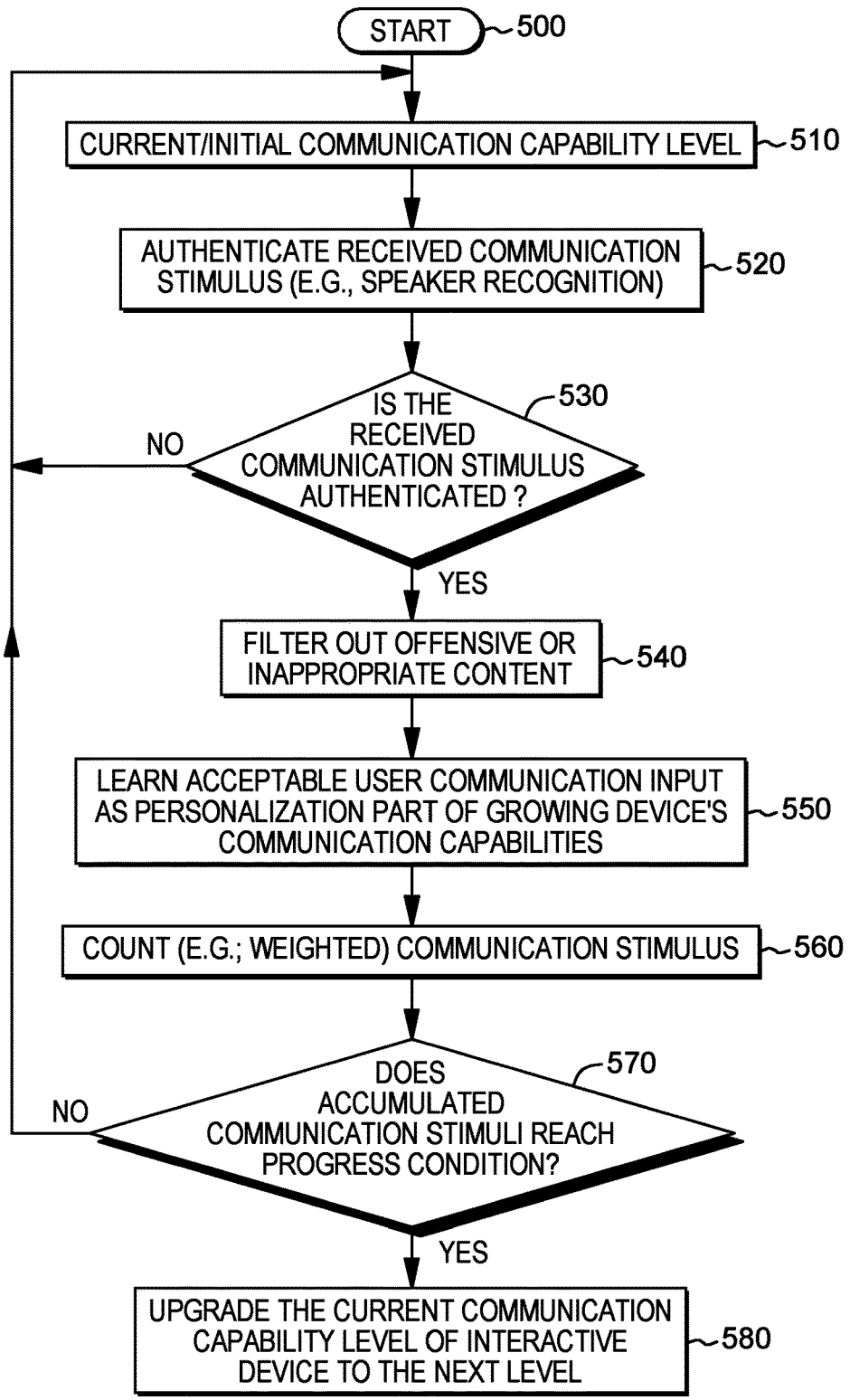
FIG. 5 depicts a further embodiment of processing implemented by a cognitive system, in accordance with one or more aspects of the present invention.

One embodiment of processing associated with advancing natural language processing in an interactive device or toy such as described herein is depicted in FIG. 5. The processing is in response to one user's communications with the device, by way of example only. Referring to FIG. 5, processing starts 500 by determining a current or initial communication capability level 510 of the device, which sets a current natural language processing capability. Setting the initial communication level may involve considering a user's age, grade, etc. to understand current capability of the user as compared to public norms. When the device receives a communication from the user, the device may validate the received communication to determine whether the communication should be counted towards progressing of the interactive device 520. This authentication process may include using one or more biometric evaluations, such as voice recognition, facial recognition, finger print recognition, etc. If the received communication is not from the specified user, then the device may maintain its current communication level 530. Conversely, if the communication is from the specified user, then the interactive device may count one or more aspects of the user's communication towards the one or more specified conditions of user communication being evaluated so as to advance the device to a next level. If "yes", then processing may filter out any offensive or inappropriate content 540, such as obscenities or other antisocial language.

In the depicted embodiment, the device may learn acceptable user communication input as a personalization part of growing the device's communication capabilities 550. One or more aspects of the user's communication with the interactive device may be counted as communication stimulus towards the one or more specified conditions of user communication upon which to base advancement of the communication capability of the device from one level to the next 560. As noted, the counting may be weighted, with different words or phrases in different levels counting differently towards determining whether a specified condition has been met. For instance, the specified condition might include determining whether the user has included a particular word or phrase in the user's communication with the device from a set of words or phrases, and/or whether the user has talked with the device for a certain number of minutes or hours in a given time interval, such as a week or month. Further, the system may track whether the specified user has fairly consistently used the device over a particular time interval.

A determination is made whether the accumulated communication stimuli has reached one or more specified conditions for proceeding to the next level 570. If "no", then the device maintains the current communication level. If the accumulated communication stimuli has reached the specified condition(s) for progressing, then the device may be upgraded from the current communication capability level to a next communication capability level 580.

Figure 6A:
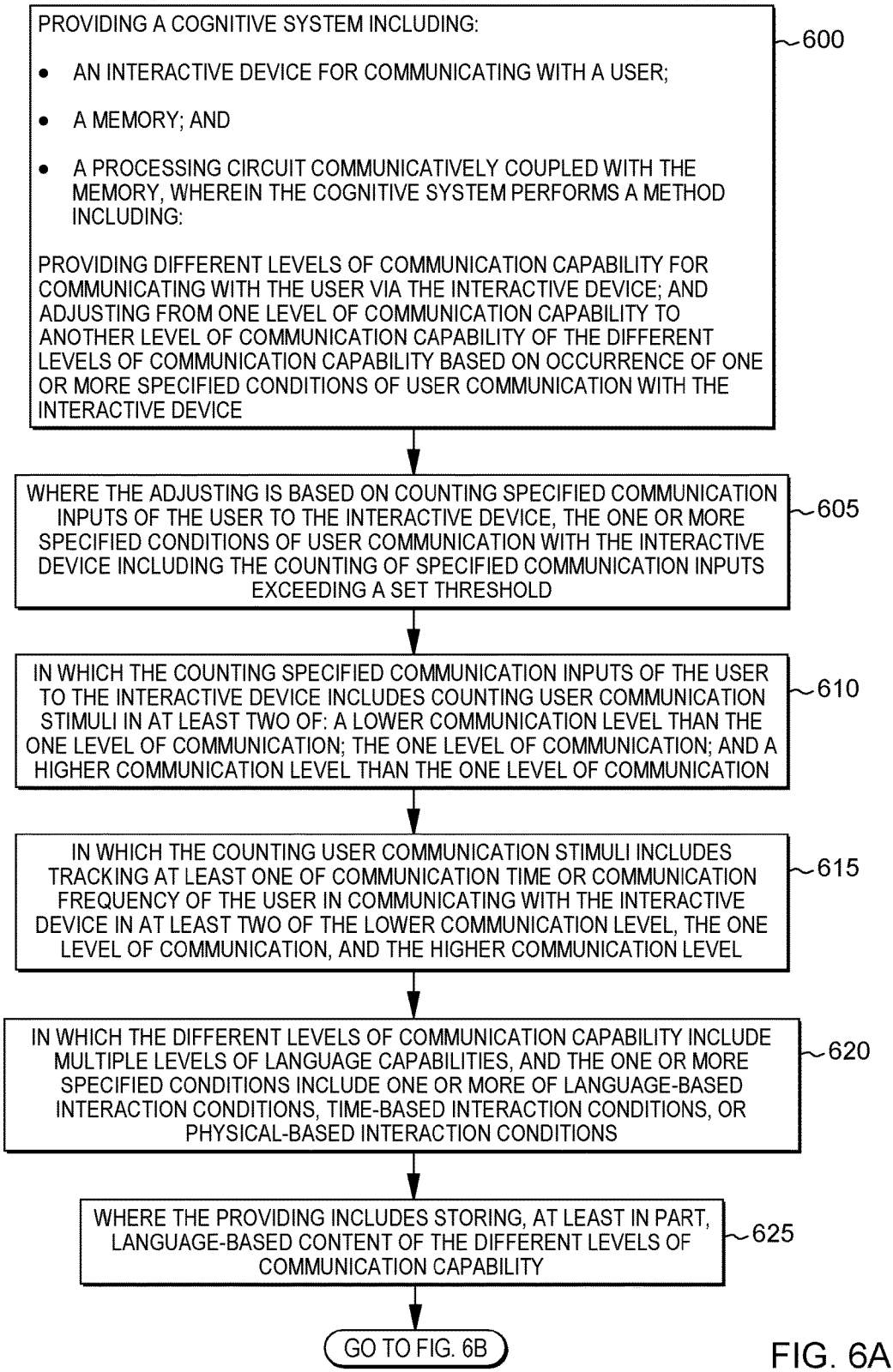
FIGS. 6A-6B depict a still further embodiment of processing implemented by a cognitive system, in accordance with one or more aspects of the present invention.
Figure 6B:
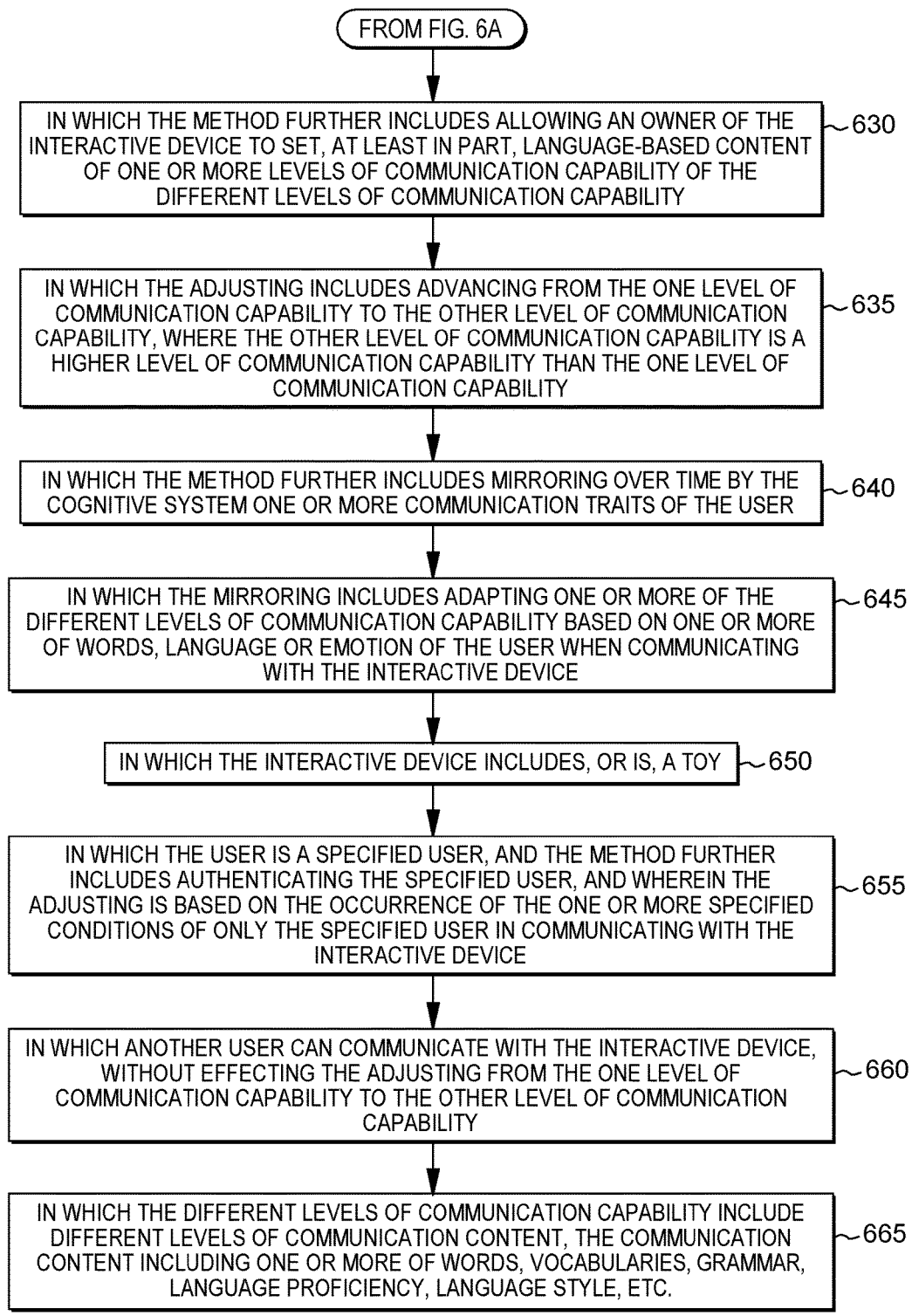

By way of further example, FIGS. 6A-6B outline further various aspects of the present invention. For instance, in one or more implementations, providing a cognitive system such as described herein may include: providing an interactive device for communicating with a user; providing multiple levels of communication capability for communicating with user via the interactive device; and adjusting from one level of communication capability to another level of communication capability of the different levels of communication capability based on occurrence of one or more specified conditions of user communication with the interactive device 600.

In one or more implementations, the adjusting may be based on counting specified communication inputs of the user, with the one or more specified conditions of the user communication with the interactive device including the counting of specified communication inputs exceeding a set threshold 605. For instance, the counting of specified communication inputs to the user to the interactive device may include counting user communication stimuli in two or more of: a lower communication level than the one level of communication; the one level of communication; and a higher communication level than the one level of communication 610. More particularly, counting user communication stimuli may include tracking at least one of communication time or communication frequency of the user in communicating with the interactive device in at least two of the lower communication level, the one level of communication, and the higher communication level 615.

In one or more embodiments, the different levels of communication capability may include multiple levels of language capabilities, and the one or more specified conditions may include one or more of language-based interaction conditions, time-based interaction conditions, or physical-based interaction conditions 620.

In certain embodiments, providing the different levels of communication capability may include storing, at least in part, language-based content of the different levels of communication capability 625. Further, in certain embodiments, the method may include allowing an owner (such as a parent of the specified user) to set, at least in part, language-based content of one or more levels of the communication capability of the different levels of communication capability 630.

In one or more embodiments, adjusting from one level of communication capability to another level includes advancing from the one level of communication capability to the other level of communication capability. In this case, the other level of communication capability is a higher level of communication than the one level of communication capability 635.

In one or more implementations, the method may further include mirroring by the cognitive system one or more communication traits of the user 640. For instance, the mirroring may include adapting one or more of the different levels of communication capability based on one or more words, language, or emotions of the user when communication with the interactive device 645.

In certain implementations, the interactive device includes (e.g., is) a toy 650. Further, in one or more embodiments, the user may be a specified user, and the method may include authenticating the specified user. In these implementations, the adjusting is based on the occurrence of the one or more specified conditions of only the specified user in communicating with the interactive device 655.

In one or more embodiments, one or more other users could communicate with the interactive device without effecting the adjusting from the one level of communication capability to the other level of communication capability 660. In certain embodiments, the different levels of communication capability may include different levels of communication content, where communication content may include one or more of words, vocabularies, grammar, language proficiency, language style, etc. 665.

Exemplary embodiments of computing environments to implement one or more aspects of the present invention are described below with reference to FIGS. 7-9.

Figure 7:
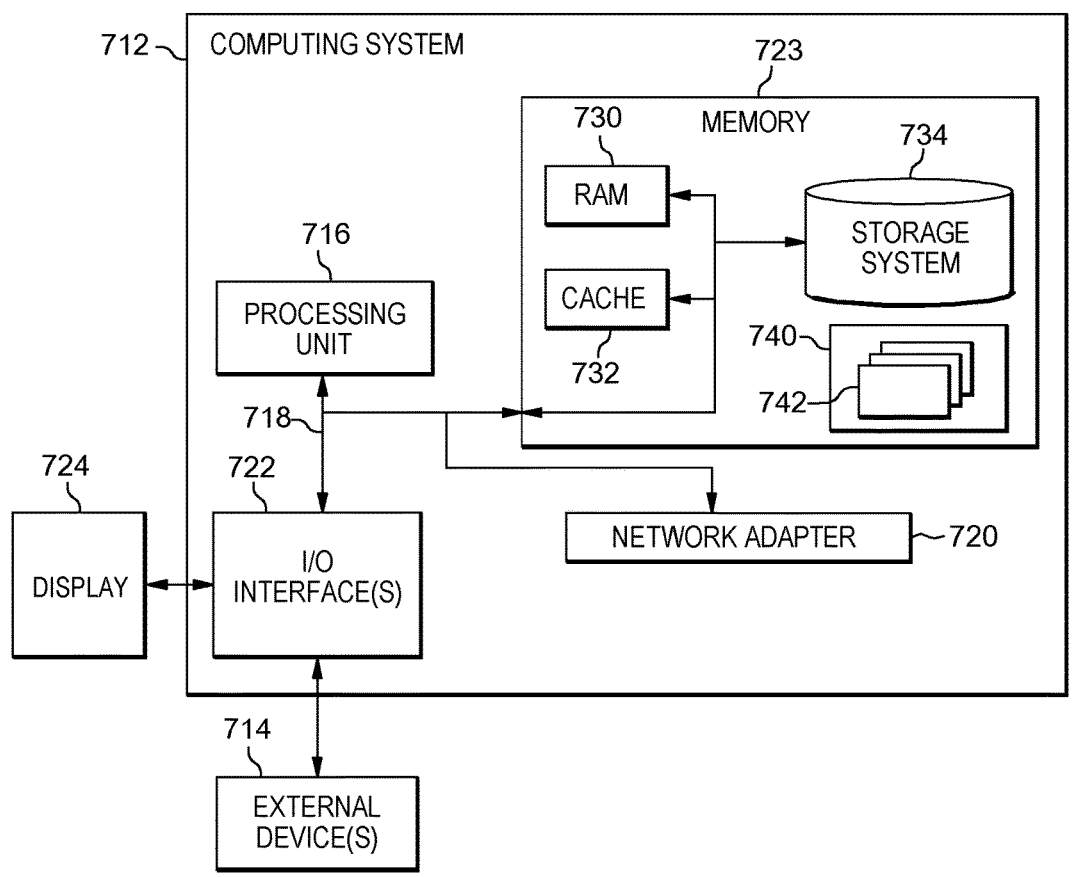
FIG. 7 is a block diagram of a data processing system in which one or more aspects of a cognitive system may be implemented, in accordance with one or more aspects of the present invention.

By way of further example, FIG. 7 depicts one embodiment of a computing environment 700, which includes a computing system 712. Examples of well-known computing systems, environments, and/or configurations that may be suitable for use with computer system 712 include, but are not limited to, a wireless computer, a handheld or laptop computer or device, a mobile phone, a programmable consumer electronic device, a tablet, a personal digital assistant (PDA), and the like.

Computing system 712 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 7, computing system 712, is shown in the form of a general-purpose computing device. The components of computing system 712 may include, but are not limited to, one or more processors or processing units 716, a system memory 723, and a bus 718 that couples various system components including system memory 723 to processor 716.

In one embodiment, processor 716 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 712 may include a variety of computer system readable media. Such media may be any available media that is accessible by computing system 712, and it includes both volatile and non-volatile media, removable and non-removable media.

System memory 723 can include computer system readable media in the form of volatile memory, such as random access memory (RAM) 730 and/or cache memory 732. Computing system 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 718 by one or more data media interfaces. As described below, memory 723 may include at least one program product having a set (e.g., at least one) of program modules that are configured to carry out the functions of embodiments of the invention.

Program/utility 740, having a set (at least one) of program modules 742, may be stored in memory 732 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. Alternatively, one or more separate modules, logic, etc., may be provided within computing environment 712.

Computing system 712 may also communicate with one or more external devices 714 such as a keyboard, a pointing device, a display 724, etc.; one or more devices that enable a user to interact with computing system 712; and/or any devices (e.g., network card, modem, etc.) that enable computing system 712 to communicate with one or more other computing devices. Such communication can occur via Input/Output (I/O) interfaces 722. Still yet, computing system 712 can communicate with one or more networks such as a local area network (LAN), a general wide area network (WAN), and/or a public network (e.g., the Internet) via network adapter 720. As depicted, network adapter 720 communicates with the other components of computing system, 712, via bus 718. It should be understood that although not shown, other hardware and/or software components could be used in conjunction with computing system 712. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 7. Computer system/server 712 of FIG. 7 may be practiced in distributed cloud computing environments where tasks are performed by remote processing devices that are linked through a communications network. In a distributed cloud computing environment, program modules may be located in both local and remote computer system storage media including memory storage devices. Computer system/server 712 is capable of being implemented and/or performing any of the functionality set forth hereinabove.

Figure 8:
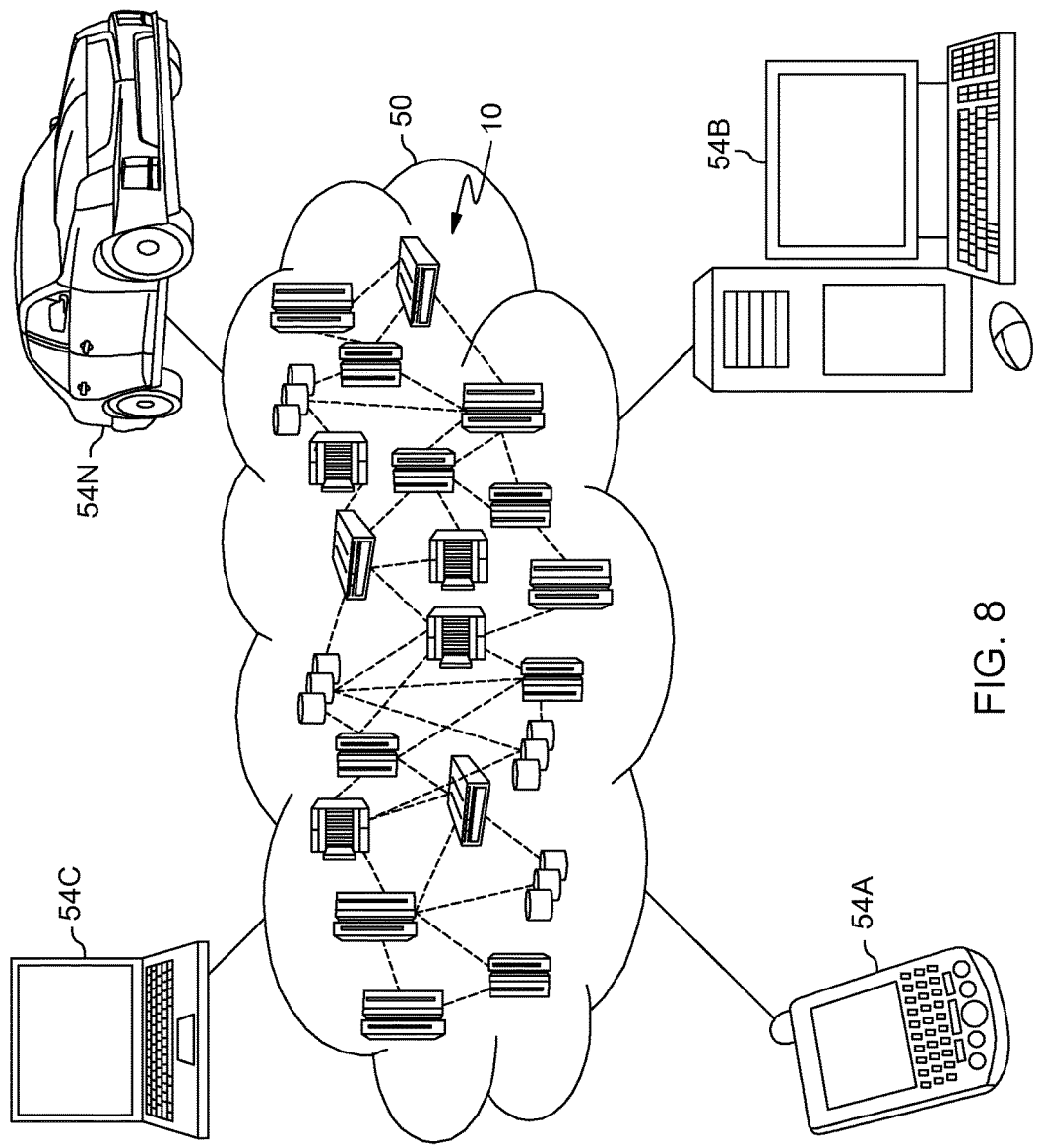
FIG. 8 depicts one embodiment of a cloud computing environment, which may implement or be used in association with one or more aspects of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 9:
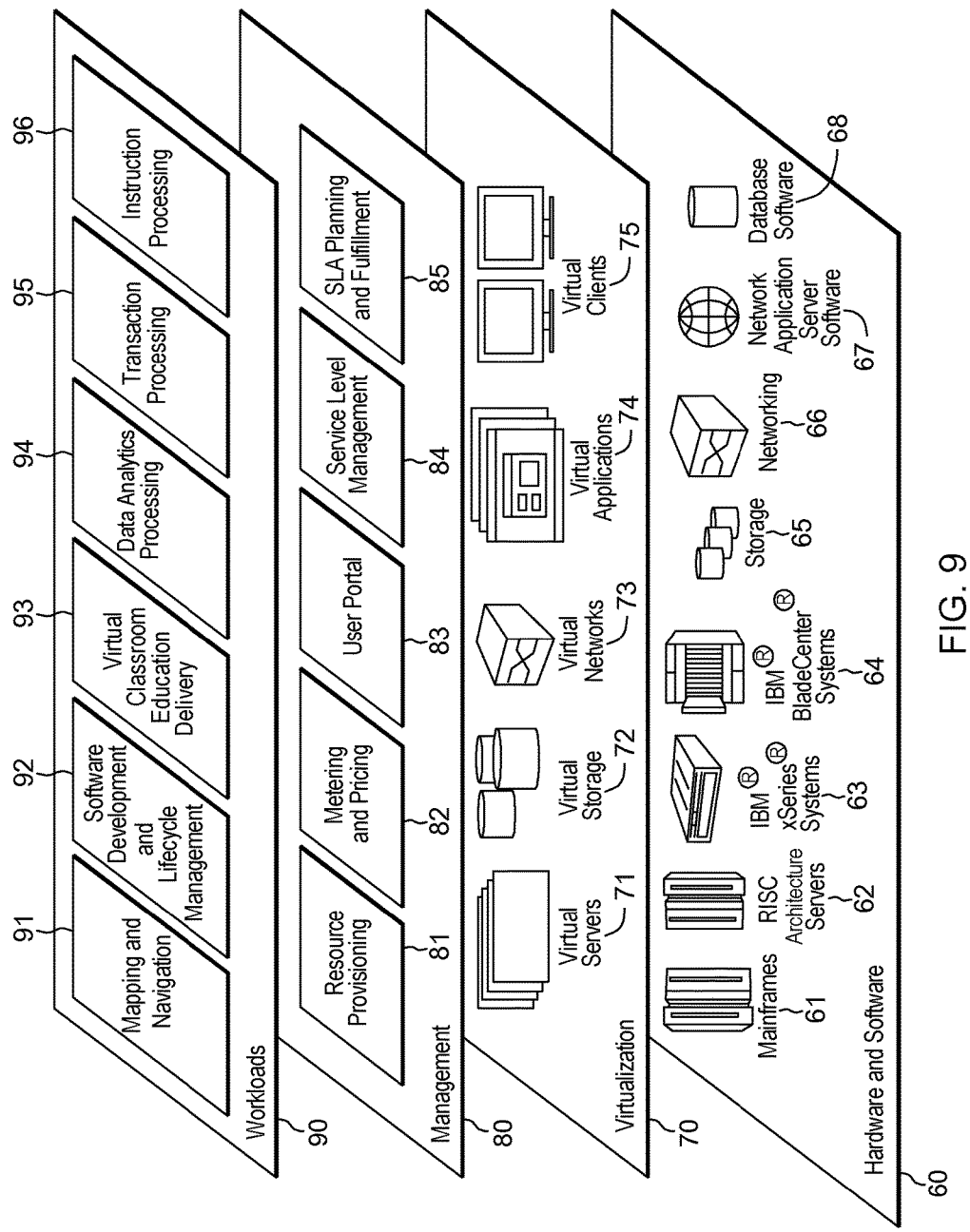
FIG. 9 depicts one example of extraction model layers, which may facilitate or implement one or more aspects of a cognitive system, in accordance with one or more aspects of the present invention.

Referring to FIG. 9, a set of functional abstraction layers provided by cloud computing environment 50 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and instruction processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a interactive computer diskette, a hard disk, a random access memory (RAM), a read-only memory (ROM), an erasable programmable read-only memory (EPROM or Flash memory), a static random access memory (SRAM), a interactive compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A cognitive system comprising:
an interactive device with communication capability for communicating with a user, the interactive device comprising:
a memory;
a processing circuit communicatively coupled with the memory; and
wherein:
the interactive device includes different levels of communication capability for communicating with the user; and
the interactive device is configured to automatically change from one level of communication to another level of communication of the different levels of communication, based on occurrence of one or more specified conditions of user communication with the interactive device during user interaction with the interactive device, wherein:
the user is a specified user, and the interactive device is configured with biometric technology to authenticate the specified user, and the automatically changing is based on the occurrence of the one or more specified conditions of only the specified user communicating with the interactive device; and
another user can communicate with the interactive device, without effecting the adjusting from the one level of communication to the other level of communication.

2. The cognitive system of claim 1, wherein the automatically changing is based on the interactive device counting specified communication inputs of the user to the interactive device, the one or more specified conditions of user communication with the interactive device comprising a total count of the specified communication inputs exceeding a set threshold.

3. The cognitive system of claim 2, wherein the counting of specified communication inputs of the user to the interactive device comprises counting user communication stimuli in at least two of: a lower communication level than the one level of communication, the one level of communication, and a higher communication level than the one level of communication.

4. The cognitive system of claim 3, wherein the counting user communication stimuli comprises counting at least one of communication time or communication frequency of the user in communicating with the interactive device in at least two of the lower communication level, the one level of communication, and the higher communication level.

5. The cognitive system of claim 1, wherein the different levels of communication capability comprise multiple levels of language capabilities, and the one or more specified conditions comprise one or more conditions from a group consisting of language-based interaction conditions, time-based interaction conditions, and physical-based interaction conditions.

6. The cognitive system of claim 1, wherein the providing comprises storing, at least in part, language-based content of the different levels of communication capability.

7. The cognitive system of claim 6, wherein the method further comprises allowing an owner of the interactive device to set, at least in part, language-based content of one or more levels of communication capability of the different levels of communication capability.

8. The cognitive system of claim 1, wherein the automatically changing comprises advancing from the one level of communication capability to the other level of communication capability, where the other level of communication capability is a higher level of communication capability than the one level of communication capability.

9. The cognitive system of claim 1, further comprising mirroring over time by the cognitive system one or more communication traits of the user.

10. The cognitive system of claim 9, wherein the mirroring comprises adapting one or more of the different levels of communication capability based on one or more of words, language or emotion of the user when communicating with the interactive device.

11. The cognitive system of claim 1, wherein the interactive device is a portable toy.

12. The cognitive system of claim 1, wherein the different levels of communication capability comprise different levels of communication content, the communication content comprising content selected from the group consisting of words, vocabularies, grammar, language proficiency and language style.

13. A computer-program product for facilitating an interactive device in communicating with a user, the computer-program product comprising:
a computer readable storage medium having program instructions embodied therewith, the program instructions being readable by a processing circuit to perform a method comprising:
providing the interactive device with different levels of communication capability for communicating with the user; and
configuring the interactive device to automatically change from one level of communication to another level of communication of the different levels of communication, based on occurrence of one or more specified conditions of user communication with the interactive device during user interaction with the interactive device, wherein:
the user is a specified user, and the interactive device is configured with biometric technology to authenticate the specified user, and the automatically changing is based on the occurrence of the one or more specified conditions of only the specified user communicating with the interactive device; and
another user can communicate with the interactive device, without effecting the adjusting from the one level of communication to the other level of communication.

14. The computer program product of claim 13, wherein the automatically changing is based on the interactive device counting specified communication inputs of the user to the interactive device, the one or more specified conditions of user communication with the interactive device comprising a total count of the specified communication inputs exceeding a set threshold.

15. The computer program product of claim 13, wherein the different levels of communication capability comprise multiple levels of language capabilities, and the one or more specified conditions comprise one or more conditions from a group consisting of language-based interaction conditions, time-based interaction conditions, and physical-based interaction conditions.

16. The computer program product of claim 13, wherein the interactive device is a portable toy.

17. A method comprising:
providing an interactive device with communication capability for communicating with a user, the providing comprising;
  providing the interactive device with different levels of communication capability for communicating with the user; and
  configuring the interactive device to automatically change from one level of communication to another level of communication of the different levels of communication, based on occurrence of one or more specified conditions of user communication with the interactive device during user interaction with the interactive device, wherein:
    the user is a specified user, and the interactive device is configured with biometric technology to authenticate the specified user, and the automatically changing is based on the occurrence of the one or more specified conditions of only the specified user communicating with the interactive device; and
    another user can communicate with the interactive device, without effecting the adjusting from the one level of communication to the other level of communication.

18. The method of claim 17, wherein the interactive device is a portable toy, and wherein the automatically changing is based on the interactive device counting specified communication inputs of the user to the interactive device, the one or more specified conditions of user communication with the interactive device comprising a total count of the specified communication inputs exceeding a set threshold.

19. The method of claim 17, wherein the different levels of communication capability comprise multiple levels of language capabilities, and the one or more specified conditions comprise one or more conditions from a group consisting of language-based interaction conditions, time-based interaction conditions, and physical-based interaction conditions.

20. The method of claim 17, wherein the different levels of communication capability comprise different levels of communication content, the communication content comprising content selected from the group consisting of words, vocabularies, grammar, language proficiency and language style.

* * * * *